United States Patent
Pipes

(10) Patent No.: US 10,536,796 B2
(45) Date of Patent: Jan. 14, 2020

(54) AUTOMATIC SECURITY ALERT SYSTEM AND METHOD USING MOBILE COMMUNICATION DEVICES

(71) Applicant: Malcolm Wade Pipes, Dallas, TX (US)

(72) Inventor: Malcolm Wade Pipes, Dallas, TX (US)

( * ) Notice: Subject to any disclaimer, the term of this patent is extended or adjusted under 35 U.S.C. 154(b) by 0 days.

(21) Appl. No.: 14/273,461

(22) Filed: May 8, 2014

(65) Prior Publication Data

US 2014/0321362 A1 Oct. 30, 2014

Related U.S. Application Data

(63) Continuation of application No. 12/811,201, filed as application No. PCT/US2008/088663 on Dec. 31, 2008, now Pat. No. 8,909,191.

(60) Provisional application No. 61/018,617, filed on Jan. 2, 2008.

(51) Int. Cl.

| | |
|---|---|
| *H04W 4/02* | (2018.01) |
| *H04W 4/029* | (2018.01) |
| *H04W 4/90* | (2018.01) |
| *H04W 76/50* | (2018.01) |
| *H04W 60/00* | (2009.01) |

(52) U.S. Cl.
CPC .............. *H04W 4/02* (2013.01); *H04W 4/023* (2013.01); *H04W 4/029* (2018.02); *H04W 4/90* (2018.02); *H04W 60/00* (2013.01); *H04W 76/50* (2018.02)

(58) Field of Classification Search
CPC ......... H04W 4/02; H04W 4/029; H04W 4/90; H04W 4/023; H04W 76/50; H04W 60/00
See application file for complete search history.

(56) References Cited

U.S. PATENT DOCUMENTS

| | | |
|---|---|---|
| 6,028,514 A | 2/2000 | Lemlson |
| 7,068,760 B2 | 6/2006 | Binning |
| 7,089,112 B2 | 8/2006 | Dooley |
| 7,126,454 B2 | 10/2006 | Bulmer |
| 7,177,399 B2 | 2/2007 | Dawson |
| 7,218,940 B2 | 5/2007 | Niemenmaa |
| 7,233,798 B2 | 6/2007 | Drawert |
| 7,251,470 B2 | 7/2007 | Faucher |
| 7,277,712 B2 | 10/2007 | Burke |
| 7,289,786 B2 | 10/2007 | Krasner |
| 7,308,272 B1 | 12/2007 | Wortham |
| 7,315,242 B2 | 1/2008 | Eisenman |
| 7,317,933 B2 | 1/2008 | Rached |

(Continued)

*Primary Examiner* — Kibrom T Hailu

(57) ABSTRACT

An Automatic Emergency Call Initiator (AECI) initiates an automatic emergency call protocol on a mobile communication system, which can be done using signaling messages. The user uses the AECI to initiate the call on a mobile station. GPS or other location data is automatically determined. Data is stored on an Emergency Notification Server (ENS) associated with an event identifier for easy retrieval or notification to emergency responders. The ENS generates an automated call to a call center and also supports the automatic emergency call protocol by storing GPS and identifying info on mobile stations meeting location criteria of the AECI initiated call. The ENS can also tag a mobile station to continue tracking mobile stations coming within a specified distance of the mobile station. A security alert protocol for predetermined mobile stations detected by a network can also be implemented using the ENS.

20 Claims, 8 Drawing Sheets

(56) References Cited

U.S. PATENT DOCUMENTS

| | | | |
|---|---|---|---|
| 7,350,715 B2* | 4/2008 | Pradhan | G01S 13/74 235/375 |
| 7,705,728 B2* | 4/2010 | Mock | G01S 5/0294 340/539.13 |
| 8,797,210 B2* | 8/2014 | Derrick | G07C 1/20 342/357.54 |
| 2003/0140060 A1* | 7/2003 | Gehlot | A61B 5/0002 |
| 2004/0174264 A1* | 9/2004 | Reisman | G07C 1/10 340/573.4 |
| 2004/0178270 A1* | 9/2004 | Pradhan | G01S 13/74 235/462.13 |
| 2004/0189517 A1* | 9/2004 | Pande | G01S 5/0018 342/357.4 |
| 2005/0227709 A1 | 10/2005 | Chang | |
| 2005/0288035 A1* | 12/2005 | Wang | H04L 29/06 455/456.1 |
| 2008/0074286 A1 | 3/2008 | Gill | |
| 2008/0227468 A1* | 9/2008 | Niska | H04W 64/00 455/456.2 |
| 2009/0085745 A1* | 4/2009 | Gupta | G06Q 10/087 340/572.1 |

* cited by examiner

AUTOMATIC SECURITY ALERT SYSTEM AND METHOD USING MOBILE COMMUNICATION DEVICES

RELATED APPLICATIONS

This application claims benefit of U.S. Provisional Application 61/018,617 filed Jan. 2, 2008, which is incorporated herein. This application is also a Continuation of Ser. No. 12/811,201 filed Jun. 29, 2010, which is a National Stage Entry of PCT/US08/88663 filed Dec. 31, 2008.

TECHNICAL FIELD OF THE INVENTIONS

Wireless communication device and network for automatically contacting emergency response services.

BACKGROUND OF THE INVENTIONS

Internet Protocol

The Internet Protocol (IP) has become the standard for packet-based computer and wireless communications. The IP communication protocol governing data transmission between different networks is referred to as the Internet Protocol (IP) standard. The IP standard has been widely adopted for the transmission of discrete information packets across network boundaries. In fact, the IP standard is the standard protocol governing communications between computers and networks on the Internet. Using the IP standard, computers on different networks communicate with other computers across their network boundaries.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device, and the TCP/IP protocol determines this routing. Because of the standard protocols in Internet communications, the IP protocol on the destination communication device decodes the transmitted information into the original information transmitted by the originating device.

TCP/IP Addressing and Routing

Under the TCP/IP protocols, a computer operating on an IP-based network is assigned a unique physical address called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent logic addressing scheme reflecting the internal organization of the network or sub-network. Each component node on the IP network can be assigned a unique IP address.

A router is used to regulate the transmission of information packets into and out of the computer network. Routers interpret the logical address contained in information packet headers and direct the information packets to the intended destination. Information packets addressed between computers on the same network do not pass through a router on the boundary of the network, and as such, these information packets will not clutter the transmission lines outside the network. If data is addressed to a computer outside the network, the router on the network boundary forwards the data onto the greater network.

TCP/IP network protocols define how routers determine the transmission path through a network and across network boundaries. Routing decisions are based upon information in the IP header and corresponding entries in a routing table maintained on the router. A routing table contains the information for a router to determine whether to accept an information packet on behalf of a device or pass the information packet onto another router.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks. The routers can be referred to by a number of names including Home Agent, Home Mobility Manager, Home Location Register, Foreign Agent, Serving Mobility Manager, Visited Location Register, and Visiting Serving Entity.

IP computer networks also include one or more network elements or components besides routers, such as hubs, switches, bridges, repeaters, gateways, and computer servers. Computer servers provide services to other computers and support the transfer and communication of data over the network. Common servers include authentication, authorization, and accounting activity (AAA) servers, Web servers, mail servers, gateway servers, and Local Area Network (LAN) servers. The various components can also be referred to as nodes.

Cellular and Mobile Communication Technology

A typical cellular communication system is comprised of multiple cell sites, each covering an intended geographic region. Each of the cell sites can be assigned an address for routing information packets, and each of the Mobile Stations can be assigned an address for their physical connectivity to the cell site.

Each cell site supports voice and data communication to the linked Mobile Stations present within that geographic area. A wireless communication link is maintained by a transceiver at or very near the center of the cellular coverage area. The transceiver is coupled to a base station transceiver substation which is coupled to a base station controller that controls the packet transmissions within the cell site area. The base station controller is also coupled to a mobile switching center, which routes calls handled by the base station controller and base transceiver station to a public switched telephone network or a packet data service node interface with the Internet.

Information packets on the communication system are processed by the base station controller for transmission to the public switched telephone network or the Internet. The base station controller processes the information packets for transmission to the public switched telephone network, the Internet, or the Mobile Station. As a Mobile Station moves across cellular boundaries, it changes its connectivity and its connectivity address, which it updates using signaling messages. Routers on the communication network have to be updated with this new connectivity address so that information packet can continue to be properly routed. The address used for routing can be a single IP address, a combination of an IP address and a connectivity address, or some other similar addressing scheme providing packet routing data on the communication network corresponding to the physical connectivity of the Mobile Station.

Telecommunication networks are complex networks used to establish connections between two or more telecommunication devices. Frequently, the devices involved with a telecommunications call or connection are referred to as the originating device and the terminating device. The user typically enters an identifying number into the originating device of the terminating device to which a call is to be placed. The network responds to entry of the identifying number of the terminating device and performs a call setup procedure that establishes, among other things, a connection between the originating device and the terminating device using IP addressing. Call data, voice or multimedia, is then routed between the two devices according the IP addressing assigned to each device.

Voice and data transmitted according to the IP packet standard is the evolving and most current communication protocol for cellular telephone communication. With this migration to the IP standard and miniaturization of computer chip technology, with dramatic increases in clock speeds, computational power, and memory storage, has come increasingly sophisticated services such as email access, streaming video and audio data transfers, instant messaging, text messaging, multimedia applications, picture messaging, Internet website access, e-commerce applications, games, and other services. Cell phones and other mobile stations have accordingly evolved from relatively crude devices limited to telephony communication to near mini-computers with operating features and capabilities equal to if not superior to early personal computers.

Mobile Stations (MS) roam within and across cellular communication sites. Each of the cells possesses one or more transceivers coupled to a Base Transceiver Station (BTS) on the communication network. The BTSs are in turn coupled to a Base Station Controller (BSC). As a MS migrates across cellular borders, its BTS physical connection changes. A MS can be physically located anywhere on the network or sub-network, and its routing address data will change and require updating on other nodes. Wireless IP networks handle the mobile nature of the MS with hand-off procedures designed to update the communication network and sub-network with the location of the MS for packet routing purposes. Because the MS can move within sub-networks and between networks, hand-off procedures are needed to insure that data packets are continually routed to the recipient MS as it moves from one network to another or from one sub-network to another. As the MS roams across the cells, the MS registers its location with the BSC and its home agent with registration messages (e.g. signaling messages, also sometimes referred to as "pings"). Using header extension formats, mobile IP registration messages can be utilized to convey various different data elements accomplishing a variety of tasks.

Cellular and associated communication technology has progressed rapidly. Mobile IP devices have evolved integrating several communication technologies, such as telephony (e.g. voice), messaging, presence, streaming video, and Internet. Global Positioning Satellite (GPS) technology has also been integrated into many mobile IP devices. A present-day mobile communication system is shown in FIG. 1, where the Public Switched Telephone Network (PSTN) 60 is connected to a Mobile Switching Center/Visiting Location Register (MSC/VLR) 40 router. The MSC/VLR 40 is coupled to a Base Station Controller (BSC) 35. The BSC 35 controls the packet transmissions to Base Transceiver Stations (BTS) 20, 25, and 30, which perform communications within the three cell sites 5, 10, and 15.

Communications on the communication system are processed by the BSC 35 for transmission to the PSTN 60, the Internet 70, or the mobile stations (MS) located within each cell site 5, 10, and 15 according to destination address data in the packet header. The MS 65 is coupled to BTS 20 by wireless signal 66. For communications being transmitted to MS 65, the BSC 35 will transmit the communication to the BTS 20. The BTS 25 and 30 are also connected to the BSC 35. Communication from the MSC/VLR 40 flows to the BSC 35 and then to the BTS 20. The BTS 20 transmits communication via a wireless communication link 66 to the MS 65. Reciprocal communications from MS 65 will be processed by the above-identified equipment in the reverse order described above. In this manner, the MS 65 will be coupled to the communication system, the PSTN 60, and the Internet 70 through these connections and system nodes.

The communication system's network core includes a Gateway GPRS Support Node (GGSN) 45 coupled to the MSC/VLR 40 as well as a Serving GPRS Support Node (SGSN) 50. The GGSN 45 is also connected to the Internet 70 and provides communication to and from the Internet 70. The SGSN 50 is also connected to a Home Location Register (HLR) 55, and the HLR 55 is connected in turn to the MSC/VLR 40. The nodes can share the same physical boxes, physically linked and separate, or even linked using routers.

Mobile IP Extensions

Extensions have been defined in the IP protocol, and extensions can be used in similar protocols, to support transmission of variable amounts and types of data in an information packet. This includes address information for mobile nodes, routers, and networks. The extension mechanism in IP permits appropriate addressing and routing information to be carried by any information packet, without restriction to dedicated message types such as discovery, notification, control, registration, and routing data packet formats.

Global Positioning Satellite Technology

Cell phones have incorporated Global Positioning Satellite (GPS) technology in recent years. Two versions for locating a cell phone basically exist. In one, and a relative recent innovation, an actual GPS receiver is incorporated into the phone, which receives signals from orbiting satellites. The GPS phone tracks its location by interpreting the data received from three or more orbiting GPS satellites to compute its longitudinal and latitudinal coordinates. In the second version, the network takes advantage of the constantly broadcast radio signaling messages (e.g. pings) used to passively register a cell phone on a network when roaming to estimate the longitudinal and latitudinal coordinates. Mobile communication companies have been able to estimate the location of a cell phone during an emergency call for several years using triangulation information from the cell towers receiving the signaling signal (i.e. radiolocation). Basically, a module at the cell site base station records the time the caller's signal reached the antenna, and the location of the caller is determined by "triangulating" the caller's distance from several tower receivers. The resulting intersecting distance radiuses from at least three towers provide the location of the cell phone.

Variations and refinements to the triangulation method have been proposed and implemented. Current locator protocols can include angle of arrival (AOA) utilizing at least two towers to locate the cell phone at the point where the reception lines along the transmission angles from each tower intersect. Time difference of arrival (TDOA) where the network determines time difference between signal arrival to compute the resulting distance from three or more towers giving the location. Time Division Multiple Access (TDMA) and Global System for Mobile (GSM) systems, such as AT&T® and T-Mobile®, generally currently use the TDOA method. Location signature is another radiolocation technique that stores and recalls signal characteristics that mobile phone signals are known to exhibit at different locations in each cell to determine location. The more recent introduction of GPS technology into cell phones provides much more accurate geographic location data, but the basic triangulation methods have improved to provide increasingly accurate geographic location data. Hybrid methods exist integrating both GPS and network radiolocation methods, such as Assisted GPS, Advanced Forward Link Trilateration (A-FLT), Timing Advance/Network Measurement Report (TA/NMR), and Enhanced Observed Time Difference (E-OTD). Assisted GPS allows use of GPS reliably indoors (GPS receivers often do not perform reliably indoors) and has been implemented by Verizon® and Sprint®.

These locator protocols have been incorporated for 911 emergency calls or other emergency call systems to allow emergency responders access to accurate location data, as well as other GPS location services. GPS equipped cell phones transmit actual GPS coordinates from the integrated GPS receiver chip. For non-GPS equipped cell phones, an emergency call from a wireless phone triggers an implemented location protocol on the network, such as three modules at three or more nearby cellular antennas to implement a TDOA triangulation location protocol. Under a United States government mandate, enhanced 911 (E911) requires this data to be automatically displayed to emergency center 911 operators with accuracy to within at least 100 meters. More recent developments and implementations have reached resolutions of ~10 m radius and less. Increasingly, GPS phones are being adopted by major cellular communication providers, and this trend is forecast to continue to include all mobile communication networks and providers. Other countries use similar emergency call numbers and communication protocols (e.g. 999 in the United Kingdom, 112 in the European Union, 000 in Australia, etc). Herein, 911 will be used generically for the differing emergency contact numbers.

Bluetooth® Communication Technology

Bluetooth® is a standard and communications protocol primarily designed for low power consumption, short range (power-class-dependent: 1 meter, 10 meters, 100 meters) communication using low-cost transceiver microchips in each device. Bluetooth enables these devices to communicate with each other when they are in range. The devices use a low-power radio communications system (approximately 1 milliwatt) in the 2.45 GHz frequency, so they do not have to be in line of sight of each other as long as the received transmission is powerful enough. Using a power amplifier on the transmitter, improved receiver sensitivity, and optimized antennas can boost ranges to 1 km.

Bluetooth® has been incorporated in many products, such as phones, printers, modems and headsets. The technology is useful when transferring information between two or more devices that are near each other in low-bandwidth situations. Bluetooth® is commonly used to transfer sound data with cell phones (i.e. with a Bluetooth® headset) or byte data with hand-held computers (e.g. transferring files). Bluetooth® simplifies the discovery and setup of services between devices, and Bluetooth® devices advertise the services they provide much as mobile stations can. This simplifies using services because there is no need to setup network addresses or permissions as in many other networks.

Any Bluetooth® device will transmit the following sets of information on demand:
Device name;
Device class;
List of services; and
Technical information (e.g. device features, manufacturer, Bluetooth® specification, clock offset).

Any Bluetooth® device can perform a discovery inquiry to discover other devices to which to connect, and any device can be configured to respond to such an inquiry. If the device attempting to connect knows the address of the device, it responds to direct connection inquiries and transmits the information shown in the list above as requested. Use of device services can require pairing or acceptance by its owner, but the communication connection itself can be started by any device and maintained until it moves out of range. Some devices can be connected to only one device at a time, and connecting to one device prevents them from connecting to other devices and responding to discovery inquiries until they disconnect from the other device.

Each device is identified by a unique 48-bit Bluetooth® device address (BD_ADDR), identical in nature to an Ethernet address. However, these addresses are generally not shown in inquiries. Instead, friendly Bluetooth® names are used, which can be set by the user. This name appears when another user scans for devices and in lists of paired devices. Most cell phones have the Bluetooth® name set to the manufacturer and model of the phone by default, and up to eight Bluetooth® devices can be connected simultaneously. Bluetooth® systems create a personal-area network (PAN), or piconet, that may fill a room or may encompass no more distance than that between the cell phone on a belt-clip and the headset on your head. Once a piconet is established, the members randomly hop frequencies in unison so they stay in touch with one another and avoid other piconets that may be operating in the same room.

The new E911 system, and other similar systems, still requires a user to physically access a cell phone or other mobile station in an emergency and initiate a regular call by dialing 911. This may be difficult or impossible in certain situations, such as when an elderly person falls and breaks a hip or a woman whose purse, with the mobile station, is out of reach after a vehicle accident or criminal attack. New communication protocols utilizing innovative cellular communication options to make remote 911 calls, or automatic emergency calls, is an advantageous innovation. Also, new innovations, such as using mobile stations as a localized emergency notification system, or a security alert system, offer advantageous emergency contact options.

SUMMARY OF THE INVENTIONS

Some, but not all, embodiments of the inventions utilize the GPS and signaling message functions of a cell phone or other mobile station device to implement several different emergency and security communication services. In one exemplary embodiment, a small Bluetooth® device that can be attached to a set of car keys, easily carried in a pocket, or even implemented as a locket around the person's neck, can initiate an automatic emergency call over a wireless linked mobile station, such as a cell phone. This automatic emergency call can also initiate a tracking protocol to continually track and store the cell phone location in, for example, a kidnapping situation. This can include automatically initiated additional signaling from the cell phone or a server/controller or other network node to keep responders apprised of cell phone movement. Additionally, the tracking protocol can include recording and tracking, or "tagging", all mobile stations within a specified radius.

In another exemplary embodiment, the BTS and/or BSC or Emergency Notification Server (ENS) automatically performs a location and communication protocol to locate all mobile stations within a specified radius and record that information in a police accessible data base and automatically contact those identified cell phones and provide notification that an emergency call was initiated nearby. This protocol can also be initiated in a normal emergency call. In yet another exemplary embodiment, a sentry function can be implemented. The BSC, other computer servers, or nodes covering sensitive locations can be provisioned with mobile station identifiers to tag if detected. This tagging will notify a call center, such as a law enforcement notification, in a security alert call, as well as starting storing location data.

Some, but not all, innovative exemplary embodiments can be summarized as follows:

Automatic Emergency Call Initiator (AECI): A communication device activates an automatic emergency contact protocol using a mobile station. Location info is automatically determined and tracked. Data is stored associated with an event identifier for easy retrieval or notification to emergency responders.

Emergency Notification Server (ENS):

Operates to capture location and identifying info on mobile stations within a specified distance (e.g. 50 m) of an emergency call.

Contacts a call center, formats, and transmits a message to the call center.

Server protocol for continually monitoring/tracking cells within a specified distance (e.g. 10 m) of an automatic emergency call on a mobile station (e.g. "tagging").

Notification and location of specified mobile devices entering a cell covered area serving a sensitive location.

Notify mobile stations within a specified radius (e.g. 100 m) and/or a specified group of mobile stations of an emergency call—a virtual/mobile emergency alarm network.

BRIEF DESCRIPTION OF THE DRAWINGS

The objects and features of the inventions will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
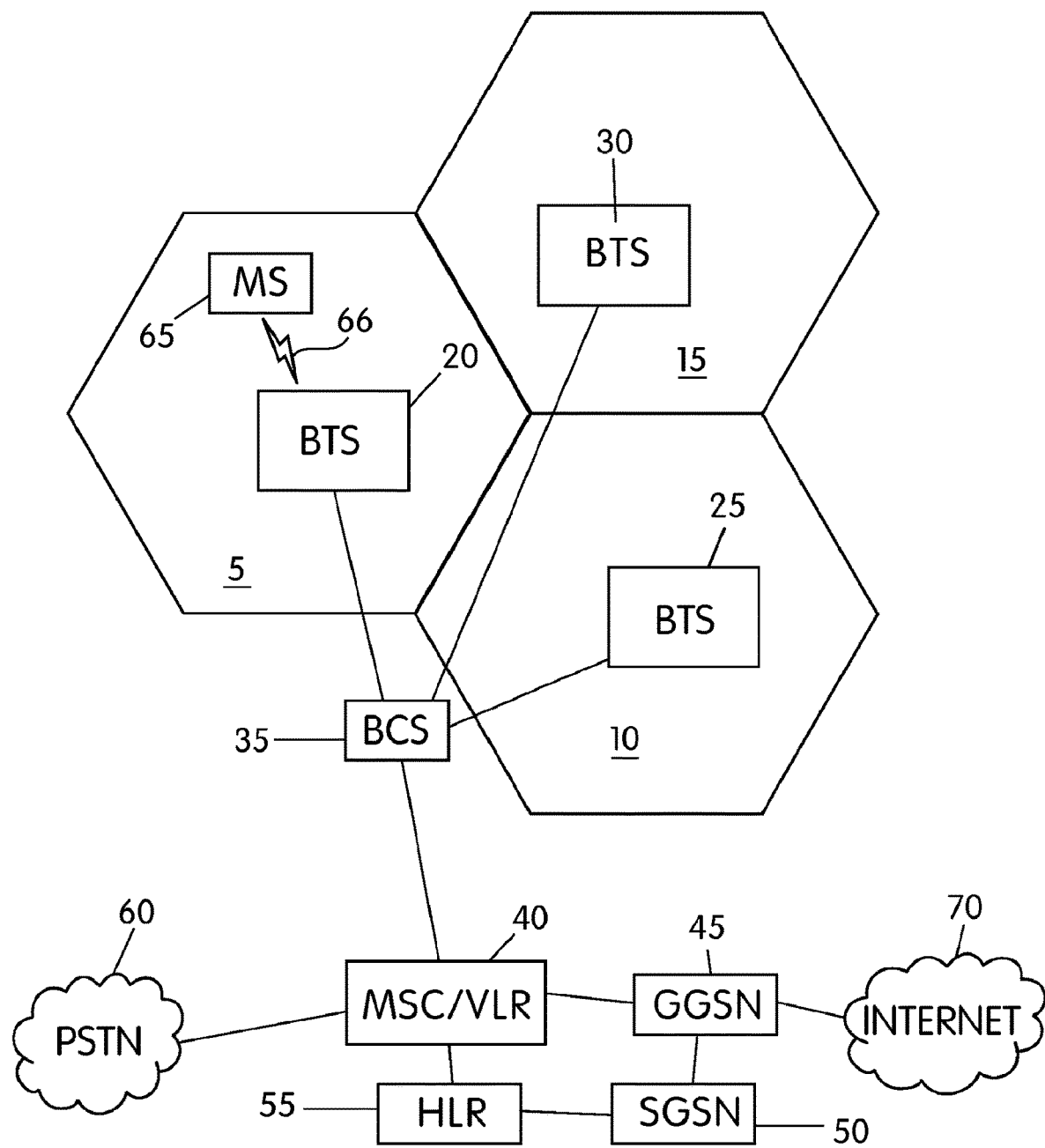
FIG. 1 is a diagram of a prior art mobile IP based communication system.
Figure 2:
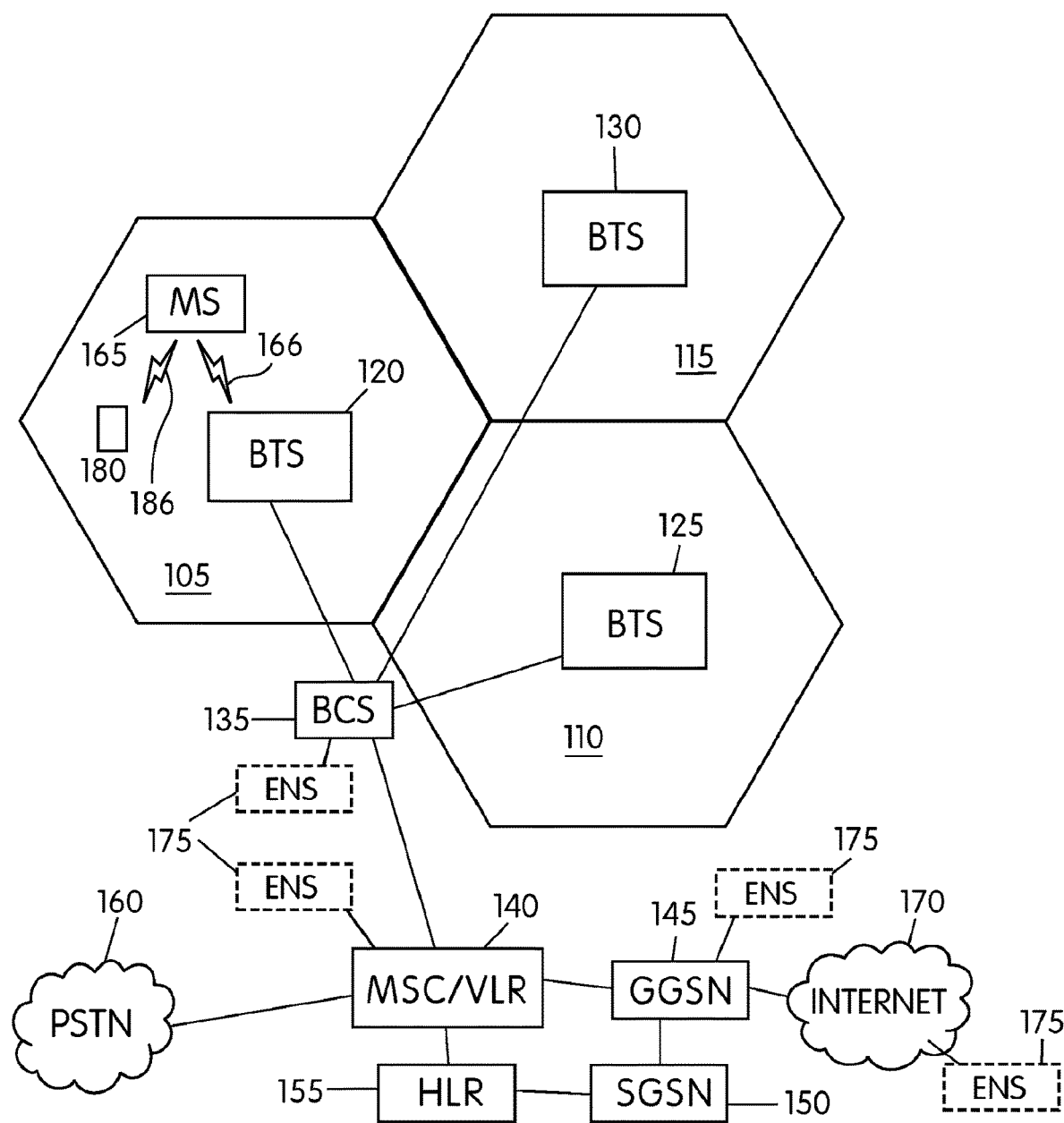
FIG. 2 is a diagram of a mobile IP based communication system implementing an embodiment of the inventions.

FIG. 2 shows an embodiment of a communication system compatible with the inventions. A Public Switched Telephone Network (PSTN) 160 is connected to a Mobile Switching Center/Visiting Location Register (MSC/VLR) 140 router. The MSC/VLR 140 is coupled to a Base Station Controller (BSC) 135. The BSC 135 controls the packet transmissions to Base Transceiver Stations (BTS) 120, 125, and 130, which perform communications within three cell sites 105, 110, and 115.

Communications on the communication system are processed by the BSC 135 for transmission to the PSTN 160, the Internet 170, or the mobile stations (MS) 165 located within each cell site 105, 110, and 115. The MS 165 is coupled to BTS 120 by wireless signal 166, and an Automatic Emergency Call Initiator (AECI) 180 is coupled to the MS 165 by wireless signal 186. For communications being transmitted to MS 165, the BSC 135 will transmit the communication to the BTS 120. The BTS 125 and 130 are also connected to the BSC 135. Communication from the MSC/VLR 140 flows to the BSC 135 and then to the BTS 120. The BTS 120 transmits communication via a wireless communication link 166 to the MS 165. Reciprocal communications from MS 165 will be processed by the above-identified equipment in the reverse order described above. In this manner, the MS 165 will be coupled to the communication system, the PSTN 160, and the Internet 170 through these connections and system nodes.

The communication system includes a Gateway GPRS Support Node (GGSN) 145 coupled to the MSC/VLR 140 as well as a Serving GPRS Support Node (SGSN) 150. The GGSN 145 is also connected to the Internet 170 and provides communication to and from the Internet 170. The SGSN 150 is also connected to a Home Location Register (HLR) 155, and the HLR 155 is connected in turn to the MSC/VLR 140. The nodes can share the same physical boxes, physically linked and separate, or linked using routers.

The GGSN 145 acts as an interface between the GPRS backbone network and the external packet data networks (e.g. Internet 170). The GGSN 145 converts the GPRS packets coming from the SGSN 150 into the appropriate packet data protocol (PDP) format (e.g. IP) and transmits them on the corresponding packet data network. In the other direction, PDP addresses of incoming data packets are converted to the network address of the destination user. These packets are then transmitted to the SGSN 150. For this purpose, the GGSN 145 is responsible for IP address assignment and is the default router for the connected MS 165. The GGSN 145 can also perform authentication and charging functions.

The SGSN 150 is responsible for the communication of data packets with the MS 165 within its geographical service area. SGSN 150 tasks include packet routing and transfer, mobility management (attach/detach and location management), logical link management, and authentication and charging functions. The location register of the SGSN 150 can store location information (e.g., current cell, current VLR, etc) and user profiles of all GPRS users registered with the SGSN 150.

An Emergency Notification Server (ENS) 175 of the inventive embodiment is shown implemented at several possible locations, and it is contemplated that a communication network may have more than one ENS 175 deployed, though in some embodiments only a single ENS 175 will be used. The ENS 175 can be implemented locally, integrated with or coupled to the BSC 135 or centrally coupled to the MSC/VLR 140 or the GGSN 145. The ENS 175 can also be implemented remotely using the Internet 170. Other implementation options are possible with the ENS 175 as a physically separate server or its function implemented on an existing server node on the network. The ENS 175 can also be implemented at a call server, either government operated or privately operated.

In one possible embodiment of the inventions, the AECI 180 includes a computer microchip, a programmable memory, a transceiver, and a battery. The memory stores configuration information for communication with the associated MS 165 and any necessary software programs. The AECI 180 can also include a microphone/speaker for voice communication via the more powerful MS 165, but it is contemplated that the AECI 180 primarily initiates an automatic emergency call in situations where voice communication is impractical or impossible. The AECI 180 transmits a low-powered signal possessing a short range of about 100 m and is contemplated to be a Bluetooth® device transmitting packets to the MS 165, though other embodiments are possible. Additionally, reducing the size to the minimum can be an important consideration, because the AECI 180 may take the form of a locket, subcomponent in a watch, attachment to key chain, or other small discrete communication device, making a speaker/microphone impractical. In some embodiments, the AECI 180 can comprise a Bluetooth® headset wirelessly linked to a MS 165. The activating signal may be triggered by a configured switch, configured voice/sound input (e.g. cry for "help", scream, sound of struggle, etc) or even noise recognized by software as a struggle.

The AECI 180 in operation transmits packetized data causing the MS 165 to automatically initiate an automatic emergency call protocol. The MS 165 automatic emergency call protocol initiate message data packet sent to the BSC 135 can include either the GPS coordinates, or the BTS 120 and/or BSC 135 will perform a locator protocol to compute location coordinates by triangulation if GPS coordinates are missing. The locator protocol can be initiated at the BTS 120 or BSC 135, the ENS 175, or even the MS 165. The "call" can actually be performed by the ENS 175, or another node, with the MS 165 conveying an initiating data packet message as a data extension in a signaling message such as an agent solicitation message, router solicitation message, binding update message, registration request, registration reply, or other signaling message. This enables an automatic emergency call to be placed without any noticeable sign that such a call was made on the MS 165, which can be very important in some situations, such as an abduction. However, various local policies may interfere with fully implementing these procedures (e.g. mandatory call backs to the originating number, which are potentially dangerous in an abduction scenario) directly with a government-operated call center (also referred to as a Public Safety Answering Point (PSAP)), so in certain embodiments, the emergency call center may be privately operated. Further, to enhance the reliability and minimize accidental activation, the activation of the AECI 180 can require two or more rapid depressions of an activation button switch.

The automatic emergency call to a recipient emergency call center can be formatted on the MS 165, the ENS 175, or another node and can include 1) an incident identifier, 2) a MS identifier, 3) a caller identifier (if available), 4) location data, 5) an identifier or other indication that the call is an automatic emergency call, and 6) contact information for rapid retrieval of further information stored on the ENS 175. It is preferable for the ENS 175 to perform the call and format the data packet and/or generate and format any voice message. It also should be noted that an automatic emergency call, by definition, indicates that the person cannot physically access and use the MS 165, and therefore the call should be interpreted by a recipient call center as indicating a dire emergency for the individual initiating the emergency call. The automatic emergency call comprises a data packet message containing the data which is set-up and routed normally through the network to the PSTN 160 and the call center using existing mobile IP protocols. However, typically the call setup and actual communication is performed by the ENS 175 rather than the MS 165, based on a signaling message protocol initiating the communication. The ENS 175 generated call can be a standard voice data message with accompanying data, a message comprised of text and location data, or some other data format.

The AECI 180 can also initiate a call answering message protocol to inform any callers that an automatic emergency call was initiated on the MS 165. This message can be locally stored for use on the ENS 175, the MS 165, or another message server, typically in a database entry. The message should basically inform any callers that an automatic emergency call was initiated and that the police or the emergency call center should be contacted. Any incoming callers are advised using this message, and the MS 165 can be effectively deactivated to incoming calls until a reset code is entered.

The ENS 175 supports the AECI 180 by performing several associated security and emergency protocols. The ENS 175 can receive an automatic emergency call initiation data packet message, which initiates several actions. The ENS 175 initiates a location protocol to identify and record identifying data for all of the mobile stations located within a specified distance of the location of the mobile station initiating the automatic emergency call. If necessary, a message is transmitted to all the cell phones requesting GPS coordinates and/or messages to adjoining BSCs and/or BTSs to perform a triangular locator procedure. Information for each MS within a specified distance (e.g. 50 m) is logged into an event entry database on the ENS 175 indexed against the incident identifier.

This information is not tied to individual phone call records, and in fact has nothing to do with phone calls using the MS or its usage per se, and therefore should not constitute privacy information that requires a warrant for law enforcement access. The location protocol is based only on the passive signaling messages and not active use of the MS and is analogous to a person being photographed at a signal light or by a surveillance camera at a public location.

This information should be easily retrievable by law enforcement agencies, can be limited to identifying suspects or witnesses, and is associated with a specific event and time as determined by the incident identifier. The stored data can include 1) the incident identifier, 2) identifiers for each MS, 3) a user identifier (if available) for each MS, and 4) location data at time of the incident. However, if required, this data can be stored for later retrieval using a search warrant.

In another embodiment, the ENS 175 can also initiate a protocol tagging mobile stations identified within a specified close distance (e.g. 10 m) for continually monitoring and tracking the location of the mobile stations. This also includes the MS 165. Identifying data information is also logged in the ENS 175 indexed against the incident identifier. This protocol can be implemented using software or firmware operating on the tagged mobile station, which causes the mobile station to periodically transmit data packets containing the location data addressed to the ENS 175. The ENS 175 continually stores the received location data information and other data indexed by the incident identifier in a database. The tagging protocol can also be implemented on network nodes using software or firmware instructing other BSCs during hand-offs to update the ENS 175 with location data periodically. Registration or other signaling messages from the tagged MS can include extensions that communicate mobile station identifier and location data to the ENS 175 addressed to the ENS 175. This protocol can also be performed by periodic signaling messages with imbedded extensions, or even a dedicated message type, transmitted by the tagged mobile station carrying GPS or other location data (e.g. a Tagged Location Message (TLM)). Additionally, if a TLM, or other appropriate used signal messaging, lacks GPS data, the message can initiate a locator protocol by the linked BSC and/or other nodes.

The tracking protocol should be continued for a specified period of time (e.g. 72-hours). This protocol is intended to help identify and track witnesses, suspects, and the individual initiating the emergency call if they are mobile (e.g. kidnapped). Collected information can be secured and released only with a warrant obtained by law enforcement. Periodic tagging can also occur to tag mobile stations remaining within the close distance radius for a specified time period.

In another embodiment, the ENS 175 and associated BSC 135 can be used to implement a virtual, mobile emergency alarm system. The ENS 175 initiates the location protocol to locate all mobile stations within a specified radius (e.g. 100 m). The ENS 175 in coordination with the BSC 135, or other nodes, notifies those mobile stations that an automatic emergency call has been initiated within the area and to be alert. This could include a broadcast phone call from personnel at a call center, a text message generated by the call center, or automatic call or text message generated by the ENS 175 or another message server. Additionally, a group of mobile stations can be configured in a centralized or remote ENS 175, so that if an automatic emergency call occurs all the mobile stations in the group are contacted. However, it may be preferable to not notify those mobile stations within close proximity otherwise meeting tagging parameters.

A further embodiment of the inventions is using the ENS 175 and/or the BSC 135 as a security alert system. An ENS 175 and/or BSC 135 is provisioned with mobile station identifiers associated with individuals on a watch list, such as a suspected terrorist or criminal suspect. In one embodiment, the ENS 175 function can be incorporated into the BSC 135 to perform the protocol or the two nodes can work together. Because of the logistics involved, it may be preferable for only BSCs or ENSs serving sensitive locations to be provisioned with the mobile station identifiers. If an associated MS enters the cell area or comes within a specified distance (e.g. 250 m) of the location, the BSC 135 contacts the ENS 175 to initiate an automatic security call giving identifying information and location. Rather than an incident identifier, the data is associated with a security alert identifier pre-stored on the ENS 175 associated with the MS identifier data, and can inform a call center of the identity of the MS, the reason the MS is on a watch list, and contact notification data for a government agency or law enforcement agency. The ENS 175 can additionally tag the mobile station as earlier described to continue tracking the mobile station after it leaves the BSC 135 coverage area. The MS identifier can include the SIM card's unique International Mobile Subscriber Identity (IMSI) number and/or the International Mobile Equipment Identity (IMEI) number. The IMEI number of the handset remains constant even if the SIM card is changed. It is further contemplated that either can be provisioned, triggering an alert in the event either is detected.

Additionally, the location of the mobile station can be tracked and additional mobile stations tagged coming within a specified radius (e.g. 10 m) for a specified elapsed time (e.g. 1 minute). In one embodiment, mobile stations meeting the specified criteria can be identified by performing an automatic emergency call locator protocol according to the elapsed time, tagging any mobile stations still within the specified radius from the performance of a first locator protocol to the next subsequent one. Other methods are possible, including monitoring by the BSC 135 to collect GPS coordinates of all cell phones at least periodically and the system tagging those phones meeting the criteria.

Figure 3A:
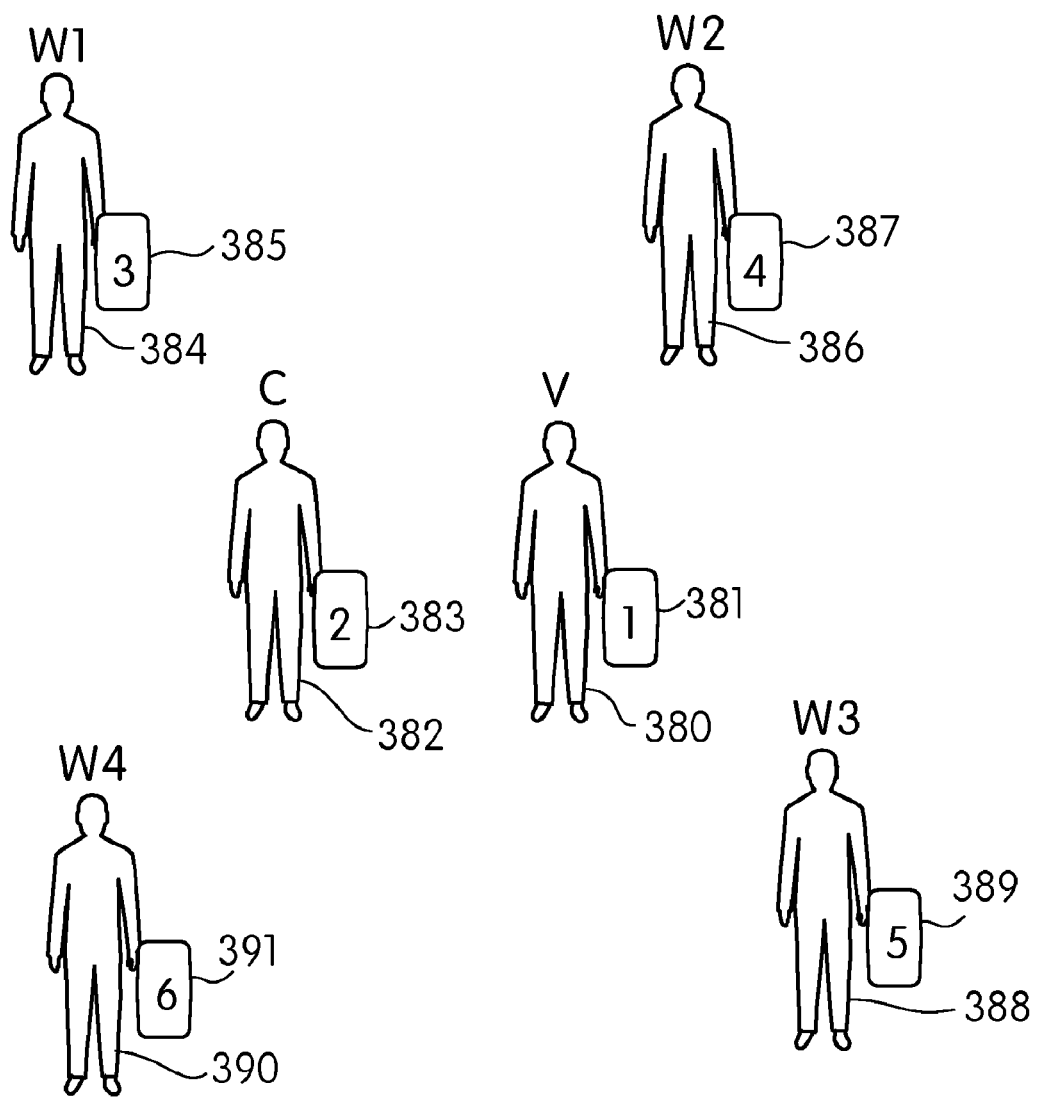
FIG. 3A-D is a stylized depiction of a practical embodiment of the inventions.
Figure 3B:
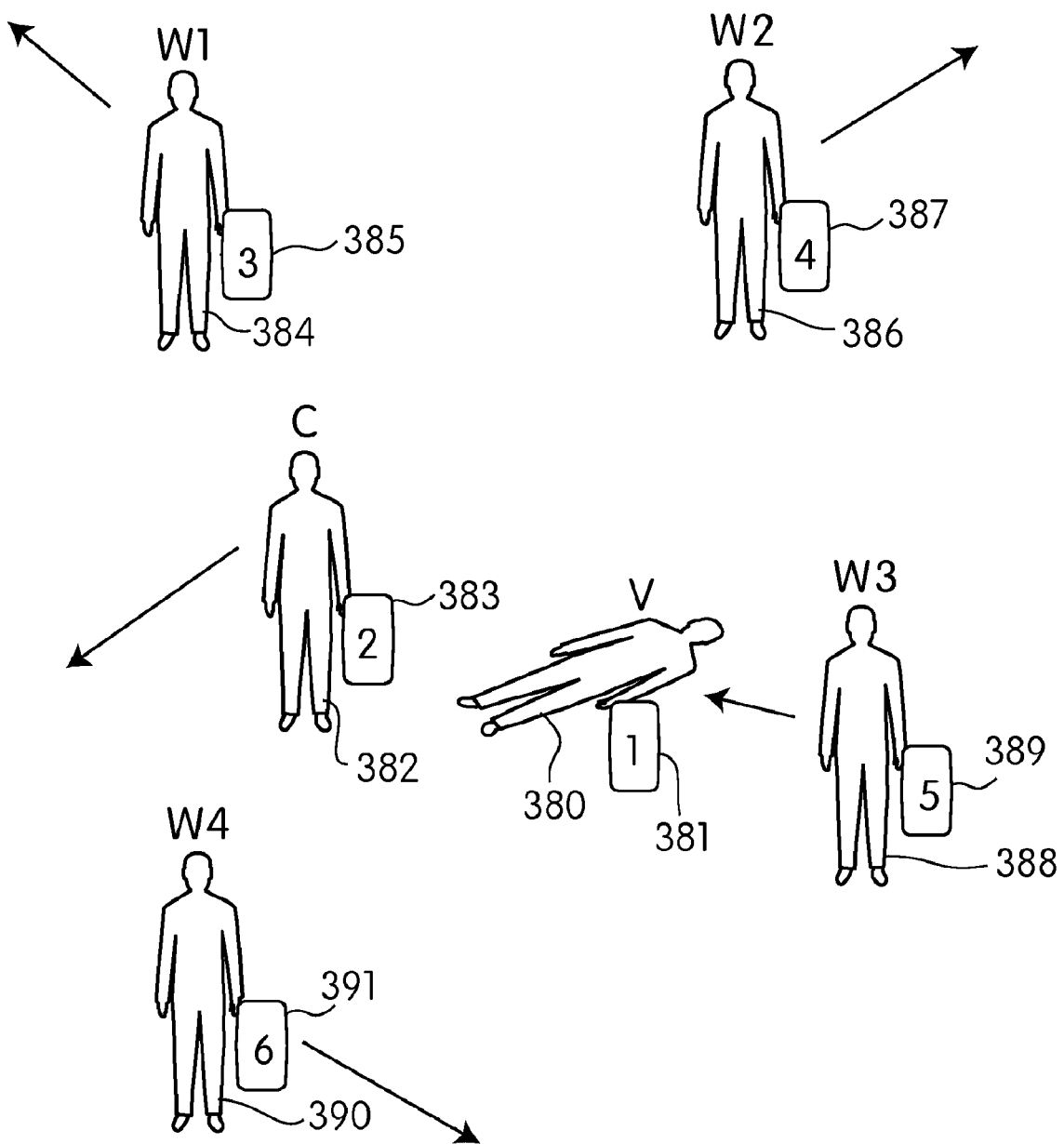
Figure 3C:
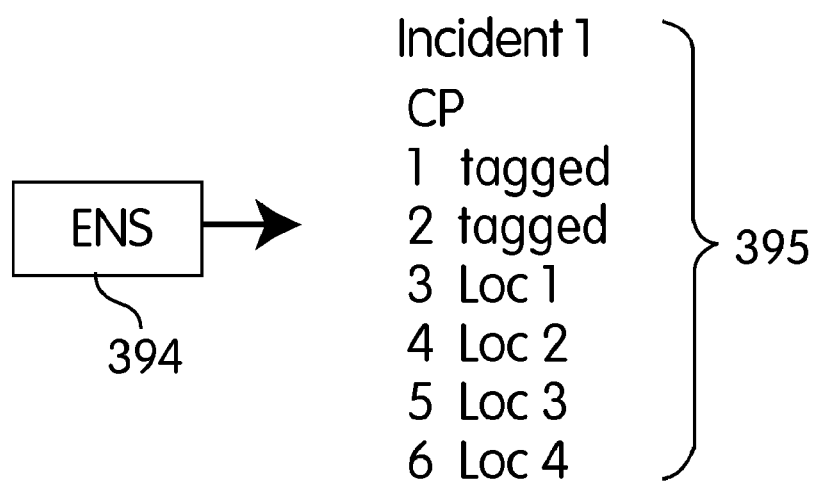

FIG. 3A-D is a stylized depiction of a practical exemplary embodiment of the inventions. In FIG. 3A, a victim (V) 380 carrying cell phone (1) 381 is attacked by a criminal (C) 382 carrying cell phone (2) 383. Witnesses (W1) 384, (W2) 386, (W3) 388, and (W4) 390 respectively carrying cell phones (3) 385, (4) 387, (5) 389, and (6) 391 are located nearby. In FIG. 3B, the C 382 flees, and the V 380 is laying on the ground, with only one witness W3 388 remaining in the area. The other witnesses W1 384, W2 386, and W4 390 have also left the area.

Figure 3D:
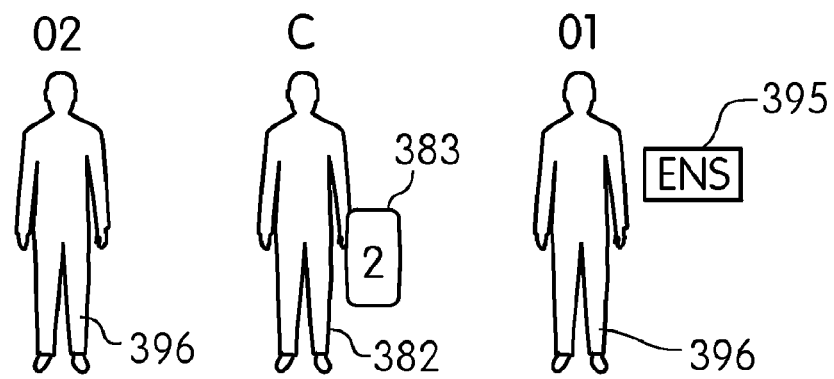

V 381 activated an AECI (not shown) during the attack, initiating the automatic emergency call protocol to identify and locate the cell phones (CP) 1 381, 2 383, 3 385, 4 387, 5 389, and 6 391. The ENS 394 stores the information in a database 395 associated with Incident 1. CP 1 and 2 are tagged, and their location continually tracked. CP 3, 4, 5, and 6 are identified and their location at the time stored as depicted. In FIG. 3D, police officer (01) 396 and police officer (02) arrest C 382, who is still carrying the tagged cell phone 2 383, located by the two officers using the ENS database 395, which continually tracks and stores the location of the cell phone 2 383.

Figure 4:
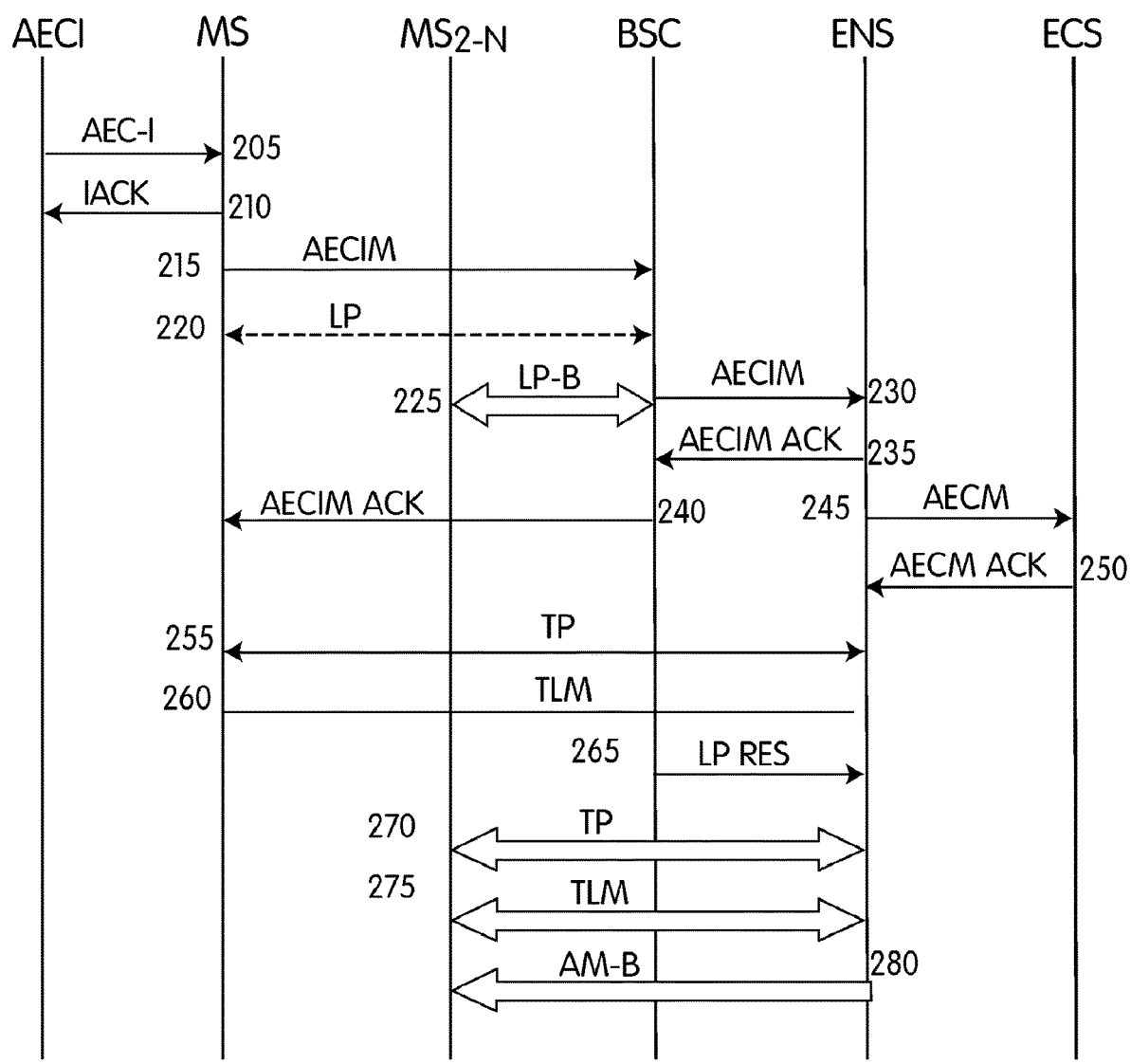
FIG. 4 is a message flow diagram for an embodiment of the inventions.

FIG. 4 is a message flow diagram for an exemplary embodiment of the inventions. These message types can be implemented as extensions to Internet Control Message Protocol (ICMP) message (e.g. agent solicitation message, router solicitation message, binding update message, registration request, registration reply, or other signaling message). In step 205, an automatic emergency call initiator (AECI) transmits an automatic emergency call initiate (AEC-I) data packet to a mobile station (MS). The MS responds to the AECI with an initiate acknowledgement (I ACK) packet in step 210. The MS also transmits an automatic emergency call initiate message (AECIM) to a BSC in step 215. In step 220, if no GPS coordinates are included in the AECI data packet, the BSC executes a locator protocol (LP) to obtain geographic coordinates for the MS, which can include a message transmitted from the BSC or coordination with other BSCs controlling adjacent cellular sites. Once the geographic/GPS coordinates of the MS are known, the BSC executes a locator protocol involving broadcasting locator protocol (LP-B) messages that includes soliciting GPS coordinates from mobile stations ($MS_{2-N}$) in the cell and/or coordination with other BSCs to obtain location data for $MS_{2-N}$ in the cell by triangulation or other available means in step 225.

At the same time, the LP messages are transmitted in step 230. The BSC transmits an automatic emergency call initiation message (AECIM) to the emergency notification server (ENS). In step 235, the ENS transmits an AECIM acknowledge (AECIM ACK) message to the BSC. In step 240, the BSC forwards the AECIM ACK message to the MS. The ENS generates an automatic emergency call message (AECM) to transmit to an emergency call system (ECS) in step 245. The AECM can include an incident identifier, mobile station identifier, and location data, as well as other data. The ECS in step 250 transmits an AECM acknowledge (AECM ACK) message to the ENS.

In step 255, the ENS performs a tagging protocol (TP) with the MS, which can involve coordinating messages with the BSC to continually update the ENS with location data, activating embedded firmware in the MS, or other implemented procedures and protocols to communicate updated location coordinates. This updating can be performed by periodic signaling messages using imbedded extensions or a dedicated message, and it can utilize the BSC. In this exemplary embodiment, a tagged location message (TLM) addressed to the ENS is transmitted to the ENS from the MS in step 260. In step 265, the BSC transmits location data in a location protocol response (LP RES) message that identifies $MS_{2-N}$ within the cell area served by either the BSC or the BTS that the MS is located within. The ENS processes this data to compute and identify $MS_{2-N}$ that meets the location criteria for tagging or storing in memory indexed by an incident identifier in a database.

In step 270, the ENS implements a tagging protocol (TP) to tag those $MS_{2-N}$ meeting the predetermined criteria for tagging. In step 275, those tagged $MS_{2-N}$ transmit a TLM to the ENS for tracking and storing location data indexed against the incident identifier in a database. Other data can also be transmitted in the TLM and stored in the ENS. Finally, in step 280, the ENS broadcasts an alert message (AM-B) text message data packet to the $MS_{2-N}$ meeting a predetermined location criteria advising that an emergency call was initiated in the area. Those $MS_{2-N}$ tagged in step 270 are not contacted.

Figure 5:
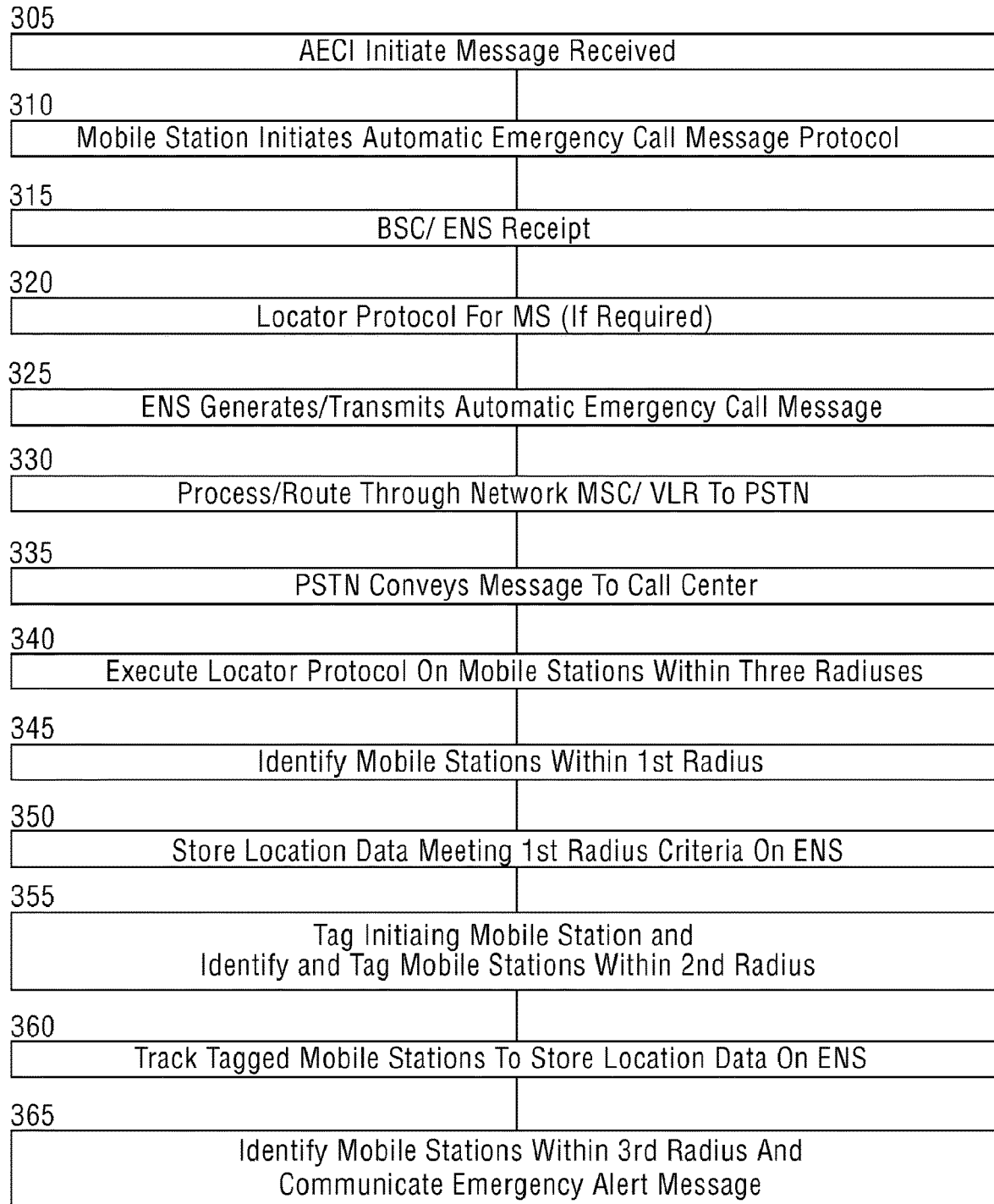
FIG. 5 is process flow diagram showing operation of an embodiment of the inventions.

FIG. 5 is a process flow diagram showing operation of the inventions in an exemplary embodiment. In step 305 the AECI initiate message is received by the MS. Then the MS initiates the automatic emergency call message in step 310, and in step 315, the BSC and ENS receive the automatic emergency call message. In step 320, a locator protocol is performed for the MS if required. The ENS generates and transmits the automatic emergency call message in step 325. In step 330, the message is processed and routed through the network MSCNLR to the PSTN. The PSTN conveys the message to a call center in step 335, with the ENS actually making the emergency call rather than the MS. A locator protocol is performed in step 340 to locate mobile stations within three predetermined radiuses.

In step 345, the mobile stations within a first radius are identified, and then the location data for any mobile stations meeting the first radius criteria are stored on the ENS in step 350. In step 355, a tagging protocol tags the initiating mobile station and any identified mobile stations located within a second radius criteria. The tagged mobile stations are tracked to store location data on the ENS in step 360. In step 365, the mobile stations within a third radius criteria are identified to communicate an emergency alert message to.

Figure 6:
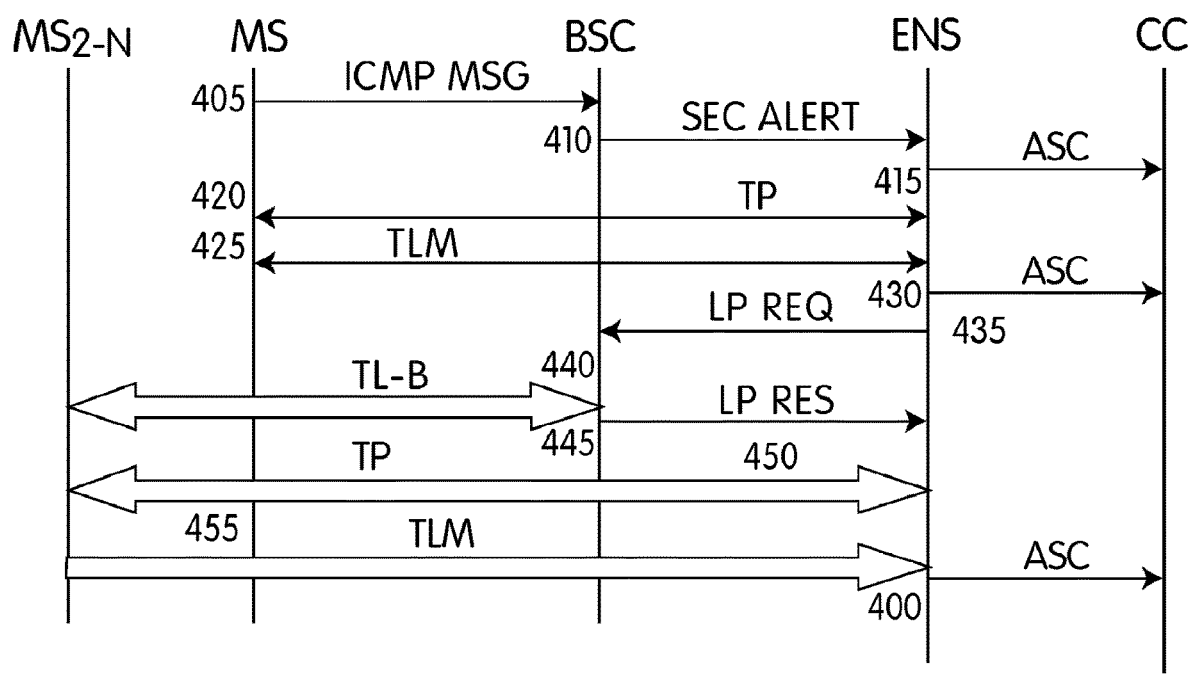
FIG. 6 is a message flow diagram for an embodiment of the security alert function of the inventions.

FIG. 6 is a message flow diagram for an exemplary embodiment of the security alert function of the inventions. In step 405, an Internet Control Message Protocol (ICMP) message (e.g. agent solicitation message, router solicitation message, binding update message, registration request, registration reply, or other signaling message) is received by the BSC from a MS. The BSC is provisioned with identifiers of mobile stations on a watch list, and the MS identifier in the ICMP message matches one of these provisioned identifiers. In step 410, the BSC transmits a security alert (SEC ALERT) message to the ENS with the MS identifier. The ENS transmits an automatic security call (ASC) message to a call center in step 415. The ASC message can include a prestored security alert identifier, the mobile station identifier, and the mobile station's current location, as well as other data. The ENS also stores the information indexed by the security alert identifier in a database.

In step 420, the ENS performs a tagging protocol (TP) with the MS, which can involve coordinating messages with the BSC to continually update the ENS with location data, activating embedded firmware in the MS, or other implemented procedures to communicate updated location coordinates periodically. This updating can be performed by periodic signaling messages using imbedded extensions or a dedicated message, and it can utilize the BSC. In this exemplary embodiment, a tagged location message (TLM) addressed to the ENS is transmitted to the ENS from the MS in step 425. In step 430, the ENS updates the call center on the location of the tagged MS in an ASC.

The ENS transmits a location protocol request (LP REQ) message to the BSC in step 435, which prompts the BSC to execute a locator protocol involving broadcasting locator protocol (LP-B) messages that include soliciting GPS coordinates from mobile stations ($MS_{2-N}$) in the cell and/or coordination with other BSCs to obtain location data for $MS_{2-N}$ in the cell by triangulation or other available means in step 440. In step 445, the BSC transmits location data in a location protocol response (LP RES) message that identifies $MS_{2-N}$ within the cell area served by either the BSC or the BTS that the MS is located within. This should be performed periodically according to a time criteria to detect $MS_{2-N}$ remaining within a predetermined radius for a set time of the tagged MS. The ENS processes this data to compute and identify $MS_{2-N}$ that meets the location and elapsed time criteria for tagging and storing in memory indexed by an incident identifier. In step 450, the ENS implements a tagging protocol (TP) to tag those $MS_{2-N}$ meeting the predetermined criteria for tagging. In step 455, those tagged $MS_{2-N}$ transmit a TLM to the ENS for tracking and storing location data indexed against the security alert identifier. This tagging data is relayed periodically to the call center in an ASC message in step 460.

As an example of a practical implementation of the inventions, a recreational vehicle (RV) operator is parked in an isolated location. The operator falls breaking his hip. In severe pain, there is no home phone and the cell phone is on the other side of the RV, but the operator has an AECI watch subcomponent. The operator initiates an automatic emergency call from the cell phone using the AECI. The ENS and system communicates GPS location coordinates and identifying data to a local 911 call center, which determines from the communicated data that the operator cannot reach the cell phone because of the emergency. The call center dispatches a police patrol to the RV at the communicated location. The ENS performs various supporting protocols as programmed, but the locator protocol fails to locate any mobile stations within the specified radiuses. The ENS still stores incident, identifier, and location data for the cell phone and tags the stationary cell phone.

In another example, a young woman going to her car is attacked in a parking lot. Her cell phone is inaccessible in her purse, but she has an AECI locket that she activates. The AECI initiates an automatic emergency call via the cell phone with identifier and GPS data. The system and associated ENS initiates the locator and tagging protocols, identifying the location of 12 mobile stations located within 50 m which is stored into memory, and three mobile stations within 10 m, which the ENS also stores in memory and tags for tracking. The collected data is stored in an ENS memory database associated with an incident identifier and includes identifying information for each mobile station and the location of the mobile stations at the time the automatic emergency call occurred.

The emergency call center receiving the automatic emergency call receives data that includes an incident identifier, a cell phone identifier, the GPS location, an automatic emergency call indicator, and contact information for retrieving ENS data relevant to the incident. The emergency call center dispatches a police car to the location. As this occurs, the BSC and/or ENS has also performed a locator protocol identifying all mobile stations within 100 m of the automatic emergency call, and the ENS utilizes this location data to transmit the following stored text message: "EMERGECY ALERT!!! AN EMERGENCY CALL HAS BEEN INITIATED WITHIN 100 METERS OF YOUR LOCATION. BE ALERT. EXERCISE CAUTION. REPORT ANYTHING SUSPICIOUS." However, the three mobile stations located within 10 m do not receive the text alert.

As the police arrive, five witnesses are present and report observing a woman apparently being forced into a vehicle by two men. One of the witnesses claims to have been in a car that was passing immediately behind the victim's car when she was attacked. The police on the scene immediately report the suspected kidnapping and request an inquiry as to any tracking and location data on an ENS.

Using the incident identifier, law enforcement quickly accesses the ENS information, which lists two mobile stations and the cell phone, which the ENS continually updates under the tagging protocol's location/tracking feature. Using the ENS, law enforcement ascertains all three mobile stations are co-located and mobile as the tagging protocol continues tracking and storing location data. Witnesses provided a description of the car and, using the location tracking information, the car is quickly located by law enforcement with a successful rescue of the kidnap victim.

Definitions

The following specific definitions are provided:

Automatic emergency call: An automatic emergency call message used to convey information relating to a mobile station in an emergency. The conveyed data includes voice or data, including text, formatted into packets transmitted to a call center that indicates an emergency situation and that the user cannot access the mobile station. Information transmitted includes location data and identifier data of the mobile station. The automatic emergency call to a call center is performed by an ENS (or other node performing the function) and does not require the mobile station.

Automatic emergency call initiator: A small, possibly hand-held, wireless device with a wireless communication link to a mobile station used to initiate an automatic emergency call. It can be a Bluetooth® device or some other short-range communication device. The AECI can optionally include voice communication capability via the mobile station. In some embodiments, the AECI can be implemented on the mobile station, such as by a programmable soft switch, or as a switch on a Bluetooth® headset.

Locator protocol: Any geographic location determining methodology available to a wireless communication system and network to determine the location geographic coordinates of a mobile station.

Security alert: A packet message transmitted when a predetermined mobile station is detected containing at least a mobile station identifier data and location data.

Security alert protocol: A protocol initiated upon detection of a predetermined mobile station identifier at a network node to contact a call center and report the location of the mobile station. The protocol can also include tagging the mobile station and identifying mobile stations coming within a predetermined radius of the mobile station for a predetermined time period. The additional identified mobile stations can also be tagged. The additional identifying and tracking data can also be communicated to the call center.

Tag, tagging, or tagging protocol: A protocol performed by a wireless communication system for continually monitoring and tracking geographic location data of an identified mobile station. The protocol can be implemented using software or firmware operating on the tagged mobile station causing periodic transmission of data packets with the location data addressed to an ENS, by network nodes instructing other BSCs during hand-offs to update the ENS with location data periodically, or any other methodology to continually update the ENS with location data, including use of a dedicated TLM or data extensions in signaling messages.

Virtual, mobile emergency alarm protocol: A protocol that locates and identifies all mobile stations within a predetermined radius of a mobile station making an automatic emergency call, and/or a group of predetermined mobile station, and transmits a notification message to those mobile stations that an automatic emergency call was initiated. Can also occur in a conventional emergency call.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

One such specific variation is incorporating the disclosed ENS functions into an existing server node or nodes. Discussed variations specifically identify the BSC, but the MSC, VLR, HLR, or any other node can be programmed with one or more of the disclosed ENS functions, and claims for the ENS extend to these other nodes. Other nodes in various communication standards, such as GSM, can be used to implement the inventions.

It is also readily apparent that the ENS and BSC can reside on different networks or sub-networks. Furthermore, the BSC may require coordination with BTSs and BSCs on different networks or sub-networks to perform a locator protocol. The tagging protocol likewise can cross network and sub-network boundaries. The MS located and tagged can also be associated with a foreign network, and as the tagged MS moves across cell sites, regardless of network association, geographic location is tracked and stored.

It is also contemplated that some form of verification might be required in certain implementations. Verification procedures may be required by local policies at call centers. Various verification protocols can be implemented as required or desired, such as a call back to the MS from a call center. However, an advantage of some embodiment innovations herein is that no indication may exist on the MS that an emergency call was made, which is clearly advantageous in an abduction situation. The automatic emergency call initiation may occur when a person is not otherwise able to access the MS, or the MS may in fact not be compatible with receiving a voice call back (e.g., a personal computer on a wireless network). Any practical implemented verification procedure should consider and allow that the MS cannot be freely accessed or even be compatible with voice communication. Even if local policies preclude full implementation, various aspects, such as tagging, can still be implemented.

The AECI can also be interfaced with a device monitoring biological/medical or physical parameters, implementing the automatic emergency call protocol if a condition is met. This can be tied to pulse, temperature, respiration, or other parameters, including environmental conditions, such as G-force, temperature, or speed. The interfaced AECI (or multiple interfaced AECIs) can be used in conjunction with a non-interfaced AECI as a modular piconet. This can offer advantages, as different sensors are added or removed, avoiding the cost of multiple dedicated transmitters to a wireless network, since each sensor is linked to a common MS. This could enable, as an example, a cross country runner to configure a pulse rate monitoring AECI, temperature monitoring AECI, and wristband mounted AECI with his cell phone when running Of course, one aspect of the embodiments is the ability to function with a variety of mobile communication devices having a wireless link to a network and an AECI (e.g., cellular phone, computer, Blackberry®, etc). This can include prepaid cellular phones, which are generally regarded as untraceable to a registered owner. A prepaid cellular phone can still be located, identified (e.g., by telephone number, IMEI, etc), and tagged. As a result, in certain implementations, a prepaid cell phone will be handled the same as any other cell phone, equally susceptible to the innovative protocols of the inventions. This should help alleviate recognized concerns of police and security agencies world-wide that prepaid mobile services allow anonymous users to engage in criminal or terrorist activities with relative impunity. Although the identity of the user may remain unknown, a tagged prepaid cell phone can be tracked and a user identified through standard investigative techniques.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. The claims as filed are intended to be as comprehensive as possible, and NO subject matter is intentionally relinquished, dedicated, or abandoned.

While the inventions have been particularly shown and described with respect to preferred embodiments, it will be readily understood that minor changes in the details of the inventions may be made without departing from the spirit of the inventions.

Having described the inventions, I claim:

1. A communication system implementing a security alert system, comprising:
    at least one node on the communication system provisioned with data associated with at least one mobile station identifier associated with a person on a watch list and used to detect said at least one mobile station upon initial receipt of a signaling message containing said data;
    a node on the communication system used in an automatic security call protocol to communicate to a location a security alert data packet; and
    the communication system tags the at least one mobile station to automatically continue location tracking in real time.

2. The communication system of claim 1, wherein a node detects the at least one mobile station via a signaling data packet received from a mobile station.

3. The communication system of claim 1, wherein the system tags another mobile station meeting a location and time criteria in relation to an already tagged mobile station.

4. The communication system of claim 3, wherein a tagged another mobile station tags other mobile station meeting a location and time criteria in relation to the tagged another mobile station.

5. The communication system of claim 1, wherein the system tags another mobile station meeting a location and time criteria in relation to the tagged at least one mobile station.

6. The communication system of claim 1, wherein the system is used in a virtual, mobile emergency alarm protocol to notify a set of predetermined mobile stations of the location of the at least one mobile station and information relating to the security alert.

7. The communication system of claim 1, wherein the communication system executes a locator protocol to identify and record identifying data for all the mobile stations coining within a predetermined location and time criteria of the at least one mobile station.

8. The communication system of claim 1, further comprising:
    a transceiver communication node that receives an emergency data packet used to summon help without voice communication from a human user of a transmitting mobile station;
    a node transmitting an emergency call message in a text or voice format to an emergency call center, said node also communicating the location of the mobile station, and said emergency call message initiating an automatic emergency call protocol;
    the system tagging the transmitting mobile station and any other mobile station meeting a location criteria in relation to the transmitting mobile station in response to the emergency data packet.

9. A communication system implementing a security alert system, comprising:
    a communication system provisioned with a mobile station identifier associated with a person on a watch list used to detect said mobile station upon initial receipt of a message packet containing said mobile station identifier;

at least one node in the communication system programmed with an automatic security call protocol initiated upon detecting the said mobile station to communicate location and information relating to said mobile station in a security alert data packet; and the communication system initiating a tagging protocol to tag the mobile station to automatically track its location in real time.

10. The communication system of claim 9, wherein the communication system uses one or more nodes in a hybrid GPS/radiolocation method to locate said mobile station.

11. The communication system of claim 9, wherein the communication system identifies all mobile stations entering a specified radius centered on a tagged mobile station, and tags any such identified mobile station remaining within the specified radius for a specified time duration.

12. The communication system of claim 9, further comprising:

the communication system alerts ones of a selected group of mobile stations of an initialized security alert protocol; and each ones of said group of mobile stations receives location information on said tagged mobile station.

13. The communication system of claim 9, further comprising:

a node on the communication system detecting the least one mobile station identifier using a signaling message packet.

14. The communication system of claim 9, further comprising:

a server node generating and transmitting the security alert data packet.

15. The communication system of claim 9, further comprising:

a transceiver communication node that receives an emergency data packet used to summon help without voice communication from a human user of a transmitting mobile station;

a node transmitting an emergency call message in a text or voice format to an emergency call center, said node also communicating the location of the mobile station, and said emergency call message initiating an automatic emergency call protocol; and the system tags the transmitting mobile station and any other mobile station meeting a location criteria centered on the transmitting mobile station.

16. A method for implementing a security alert on a telecommunication system, comprising:

provisioning at least one node on the communication system with at least one mobile device identifier, and then;

detecting said at least one mobile device identifier in an initial signaling message data packet;

executing an automatic security call protocol upon detecting to transmit a security alert message to a communication center; and tagging the at least one mobile device to automatically track location in real time.

17. The method of claim 16, further comprising the step of:

executing a locator protocol to locate said mobile device, the locator protocol utilizing at least partially a radiolocation method to locate said mobile station.

18. The method of claim 16, further comprising the steps of:

identifying all mobile devices entering a specified radius of a tagged mobile device for specified time duration.

19. The method of claim 16, further comprising the step of:

alerting ones of a group of mobile devices of an initialized security alert protocol; and transmitting information relating to said tagged mobile device to each of said ones mobile devices.

20. The method of claim 16, further comprising the steps of:

receiving an emergency data packet on the communication system to summon help without voice communication from a user of a transmitting mobile device;

transmitting an emergency call message in a text or voice format to an emergency call center, the call message also communicating the location of the transmitting mobile device; and tagging the transmitting mobile device and any other mobile device matching a location criteria in relation to the transmitting mobile device.

* * * * *

UNITED STATES PATENT AND TRADEMARK OFFICE
CERTIFICATE OF CORRECTION

| | | |
|---|---|---|
| PATENT NO. | : 10,536,796 B2 | Page 1 of 1 |
| APPLICATION NO. | : 14/273461 | |
| DATED | : January 14, 2020 | |
| INVENTOR(S) | : Malcolm Wade Pipes | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 368 days.

Signed and Sealed this
Seventh Day of February, 2023

*Katherine Kelly Vidal*

Katherine Kelly Vidal
*Director of the United States Patent and Trademark Office*